United States Patent [19]

Carlson et al.

[11] Patent Number: 4,685,109
[45] Date of Patent: Aug. 4, 1987

[54] GAS LASER CONSTRUCTION

[75] Inventors: Lee R. Carlson, Pleasanton; Denes A. Hegedus, Redwood City; Steven M. Jarrett, Los Altos; Michael F. Miller, Mountain View; Martin E. Riley, Grass Valley; David L. Wright, Rough and Ready, all of Calif.

[73] Assignee: Spectra-Physics, Inc., San Jose, Calif.

[21] Appl. No.: 906,356

[22] Filed: Sep. 11, 1986

Related U.S. Application Data

[62] Division of Ser. No. 649,206, Sep. 10, 1984, Pat. No. 4,649,547.

[51] Int. Cl.$^4$ ................................................. H01S 3/03
[52] U.S. Cl. ........................................ 372/61; 372/62; 445/28
[58] Field of Search ............... 372/61, 62; 445/28; 29/157.3 A

[56] References Cited

U.S. PATENT DOCUMENTS 4,378,600  3/1983  Hobart ................................. 372/62
4,553,241  11/1985  Chaffee ................................ 378/62

Primary Examiner—Leon Scott, Jr.
Attorney, Agent, or Firm—Paul Davis; Thomas M. Freiburger

[57] ABSTRACT

A plasma tube for a gas laser includes a series of heat webs and insulative spacers between the heat webs, with tungsten bore insert members supported by the heat webs and having aligned apertures defining a laser discharge path. To produce the plasma tube, the heat webs, spacers and other connected components are assembled in a vertical stack outside the ceramic tube of the laser, with a stacking gauge which helps assure that the heat webs are correctly spaced apart within close tolerances. The heat webs lie adjacent to annular metallized areas on the inside surface of the ceramic tube when the assembly is inserted into the tube, which is precision-formed ceramic tubing. The tube assembly is heated in vertical orientation to expand the heat webs diametrically so that they engage outwardly against and are brazed to the metallized areas of the ceramic tube. The heat webs are of a special configuration that substantially eliminates hoop stress in the ceramic tube under conditions of rising and falling temperature in the discharge tube. For adding gas to the discharge tube, a special fill system is connected to the discharge tube for metering small and precise volumes of gas into the discharge tube when needed. The construction of the fill system also aids in heat-cleaning steps in the assembly of the laser, and in the initial gas fill. A cooling system for the discharge tube, surrounding the ceramic tube, includes a variable pitch helical flow diverter for effecting more efficient and uniform cooling of the discharge tube.

24 Claims, 10 Drawing Figures

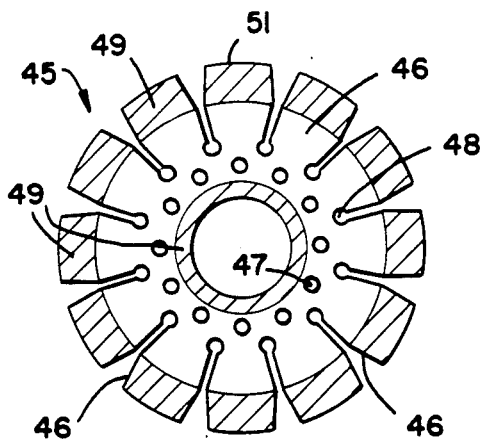
FIG _ 2
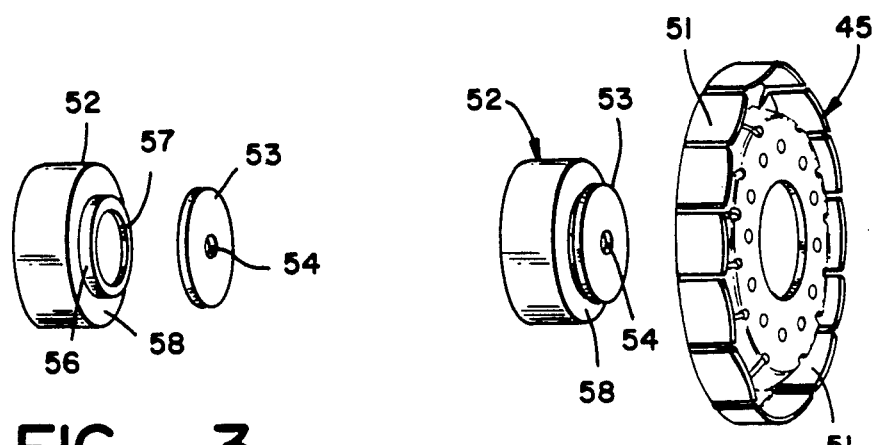
FIG _ 3
FIG _ 4
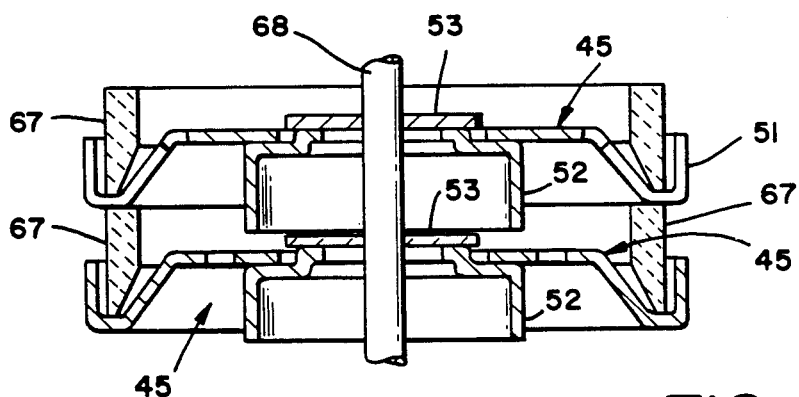
FIG _ 6

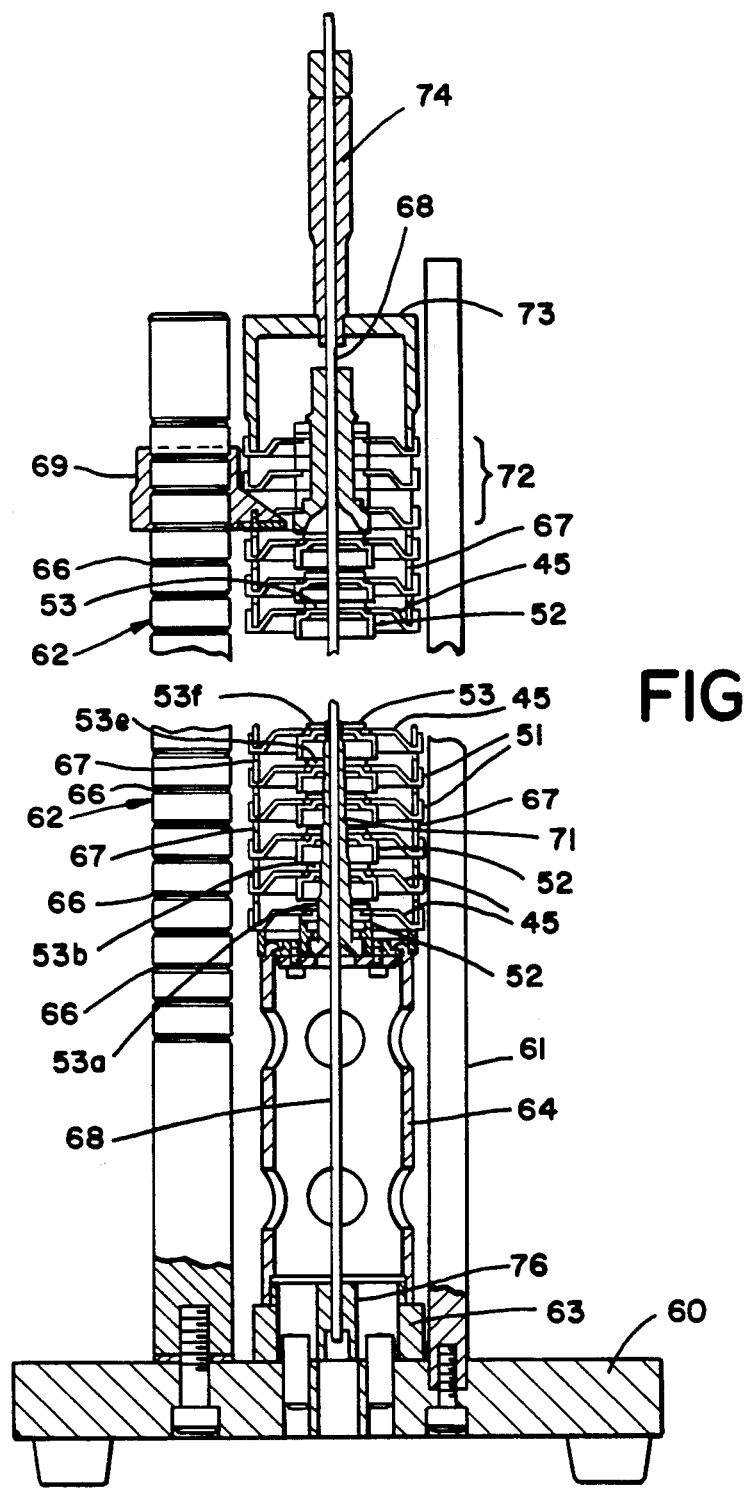
FIG _ 5

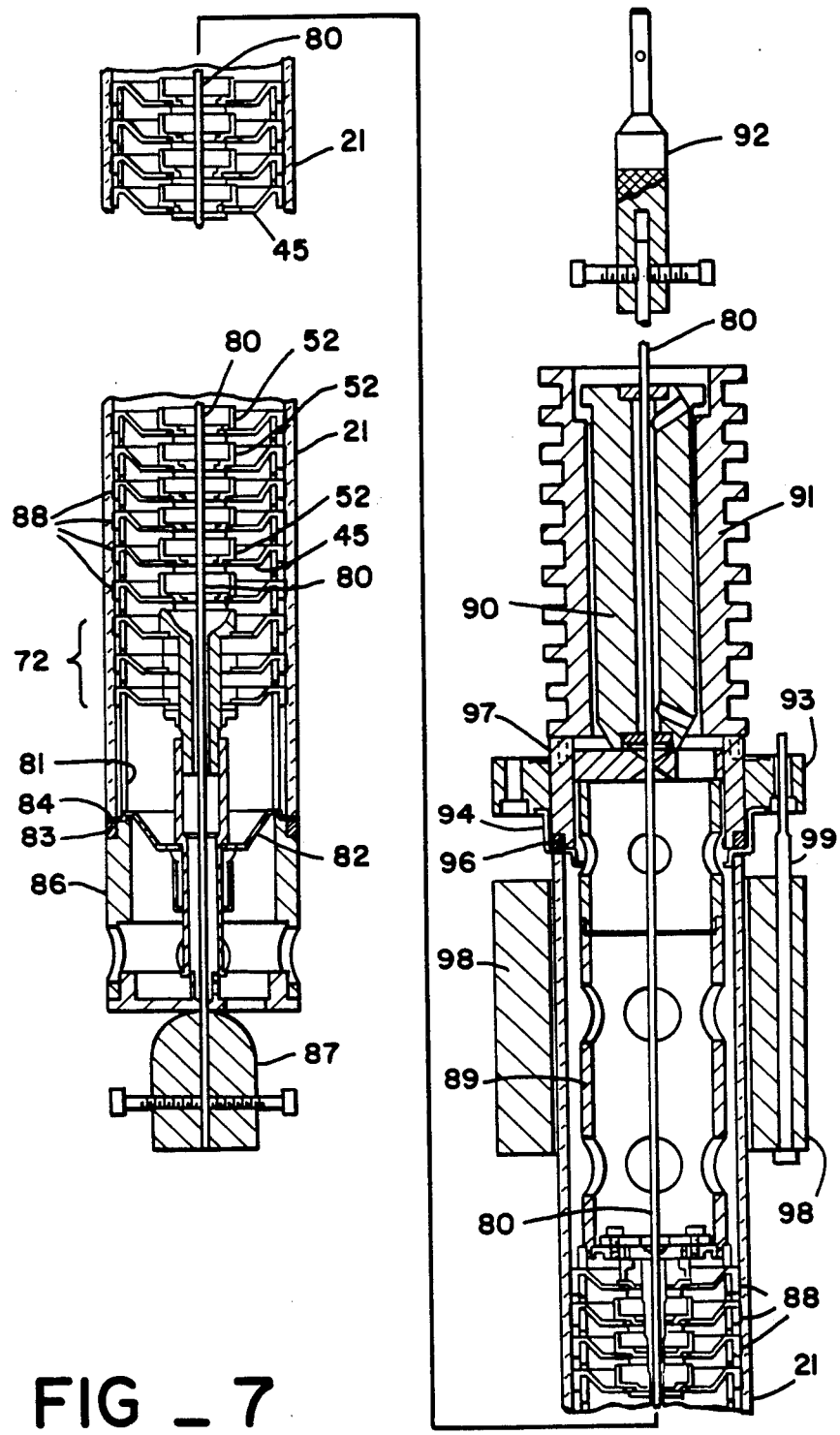
FIG _ 7

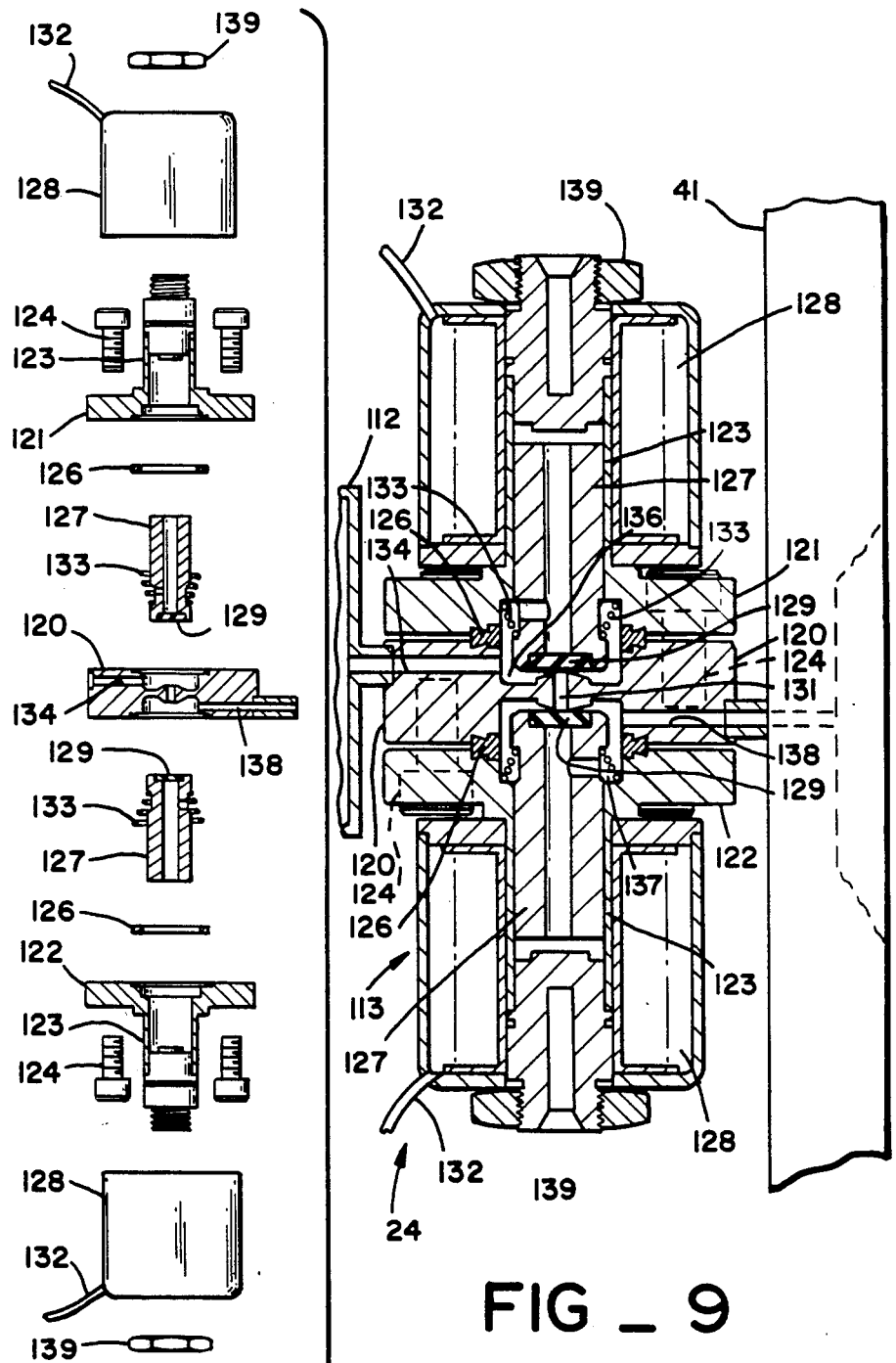
FIG_10
FIG_9

GAS LASER CONSTRUCTION

This is a divisional of co-pending application Ser. No. 649,206 filed Sept. 10, 1984, now U.S. Pat. No. 4,649,547.

BACKGROUND OF THE INVENTION

The invention relates to lasers, and more particularly to a gas ion laser having an improved laser discharge tube, gas fill system and cooling system.

Gas ion lasers, such as argon lasers, have been constructed in a variety of ways. See, for example, U.S. Pat. Nos. 3,619,810, 3,760,213, 3,501,714, 4,376,328. The latter patent discloses a gas ion laser having a plasma tube or discharge tube formed of a non-precision ceramic cylinder with a large series of cup-shaped metal-conducting members spaced apart in the tube and expanded mechanically into contact with the internal surface of the ceramic tube prior to brazing. The cup-shaped members were assembled into the ceramic tube one by one using a floating mandrel through the ceramic tube, the tube being supported on a carriage on rails, so that the tube was moved back and forth over an expansion tool which placed each member into position in the ceramic tube and expanded its outer flange against the internal tube wall. Each of the cup-shaped members had attached to it, prior to assembly in the discharge tube, a cylindrical shield for gas isolation. A sputter-resistant tungsten disk with a central aperture was also placed on the floating mandrel, on the opposite side of the cup-shaped member from the shield, and when the entire assembly was brazed in an oven, the tungsten disks were simultaneously brazed to the heat webs. The patent emphasized the ability to use a non-precision formed ceramic tube because of the method used to bring the heat members into contact with the rough ceramic surface on the inside wall of the tube.

None of the various types of laser constructions of the prior art has had the advantages of the present invention described below, particularly in terms of elimination of destructive stresses in the ceramic tube wall, ease of and precision of assembly, dependability of brazing, efficiency in heating steps and gas fill, and efficiency of operation.

SUMMARY OF THE INVENTION

According to the present invention, in a preferred form a method for producing a gas laser comprises assembling a core including a series of slitted heat webs and discs with sputter-resistant bores into a precision ceramic tube, with an anode assembly and an end cap at the anode end of the tube and a tube end flange for receiving a cathode assembly at the cathode end of the tube, the heat webs having brazing material on their periphery for brazing to the internal wall of the precision ceramic tube, preferably to metallized bands situated thereon. The assembly is heated to a first high temperature to braze the heat webs to the bands of metallization while also brazing the end cap and the tube end flange to the ends of the tube. Next the cathode assembly is connected to the tube end flange and into the tube, with a gas fill assembly connected to the cathode assembly exterior of the tube, including removable valve plungers with elastomeric valve closure members in the gas fill assembly, with the valve plungers having been removed. A vacuum source is then attached to the assembly, and vacuum is applied and maintained in the entire assembly including the tube assembly and the fill assembly, while the assembly is heated to a second, lower temperature high enough to heat-clean the assembly but not to affect the brazed connections. The assembly is then filled with gas to a positive pressure, then the removable valve plungers are replaced but held in an open position against normally closing spring pressure. Subsequently, the assembly is again filled with gas to a positive pressure desired in operation for a gas reservoir of the gas fill assembly. The valve plungers are then released and closed, to isolate the gas reservoir from the ceramic tube. The ceramic tube is then evacuated and filled to the appropriate gas pressure using the gas fill assembly.

Preferably, following replacement of the valve plungers and with them held open, the assembly is again evacuated and heated a third time, to a third temperature for heat-cleaning but low enough avoid damage to the elastomeric valve closure members. This temperature may be about 200° C.

The brazing is preferably accomplished at about 800° C., and the second heating, the heat-cleaning step, may be at about 400° C.

The gas fill assembly is of a special configuration according to the invention. It includes a gas reservoir connected to one side of a valve body, the other side of the valve body being connected into the ceramic tube, and a pair of oppositely positioned removable flanges connected to the valve body, each retaining one of the valve plungers. This assembly enables the flanges to be removed from the valve body to remove or replace the valve plungers. The flanges can be re-assembled with seals for sealing the assembly with a closed gas path from the reservoir through the valve body to the ceramic tube.

Another feature of the present invention is the method for assembling the plasma tube. This method involves the use of a precision-straightness ceramic tube with an internal wall of precise diameter with alternately metallized and non-metallized areas at regular intervals along a longitudinal axis of the tube. Outside the ceramic tube, a series of heat webs and insulative spacers are stacked with a stacking gauge, in alternating relationship, the heat webs being thereby spaced apart substantially the same distance as the metallized areas in the ceramic tube, with the heat webs being of less diameter than the internal wall of the ceramic tube and having brazing material coated on their outer surfaces. The stack of heat webs and spacers is inserted together into the ceramic tube so that each heat web is adjacent to a metallized area on the internal wall of the ceramic tube. The resulting assembly is heated in vertical orientation generally uniformly to a sufficient temperature to expand the heat webs diametrically so that each engages outwardly against the adjacent metallized area of the ceramic tube, with the brazing material melting and causing the heat webs to be brazed to the metallized areas of the ceramic tube.

Another feature of this procedure is to compensate for built up error in the stack of heat webs and spacers, and to assure proper registry of the heat webs with the metallized areas of the ceramic tube, by using an undersized spacer when the progressing stack becomes oversized by a predetermined distance and by using an oversized spacer when the progressing stack becomes undersized by a predetermined distance, the oversized and undersized conditions being determined by reference to the stacking gauge as the stack progresses.

Each heat web of this assembly preferably includes a disk-like central area and an annular series of petals extending outwardly therefrom, integral with the central area but discrete from one another, each petal terminating in a flange generally perpendicular to the central area, with brazing material coated on the outside of the petals, for contacting and being brazed to a metallized area of the ceramic tube. The petal flanges together engage against the metallized area. The petal structure substantially eliminates hoop stress on the ceramic tube during temperature changes because of the flexibility in the petals.

According to a preferred form of the invention, each heat web has placed against it centrally a cup to which is secured a bore insert with a sputter-resistant central aperture, the bore insert being brazed to the cup by a higher-temperature brazing material than that subsequently used to braze the heat webs to the ceramic tube. The cups are brazed to the heat webs during the heating step wherein the heat webs are brazed to the tube.

In assembly, the stack of heat webs, spacers and bore inserts with attached cups is retained on a straight rod passing through the apertures of the bore inserts when the stack is inserted into the ceramic tube and during heating in the brazing operation, so that the bore inserts are free-floating in their position with respect to the heat webs until the brazing is accomplished, whereby the bore insert apertures are aligned by the rod.

Another advantageous feature of the gas laser construction of the present invention is the provision of a variable pitch flow diverter within the water cooling jacket immediately surrounding the ceramic discharge tube. The flow diverter is a variable-pitch helix, graduating from an inlet end wherein the helical coils are farthest separated and the flow is most axial, to an outlet end where the coils of the helix are tightest and the cooling water flow is most circumferential. This enables maximum cooling with minimum pressure drop, avoiding cavitation which might occur if the water were forced at too great a pressure against tightly spaced helical diverter coils.

Accordingly, it is among the objects of the present invention to improve the efficiency and reliability of a gas laser by an improved method of assembling the discharge tube, by an advantageous construction of a gas fill system, by a novel series of steps for assembly, brazing and heat-cleaning the discharge tube assembly, and by an improved flow-diverter structure in the water cooling space surrounding the discharge tube. These and other objects, advantages, features and characteristics of the invention will be apparent from the following description of preferred embodiments, considered along with the accompanying drawings.

DESCRIPTION OF THE DRAWINGS

FIG. 2 is a view showing a flat metal heat web of the invention, before it has been crimped into shape.

FIG. 3 is an exploded view in perspective, showing a cup member and a bore insert, to be secured together and then to the heat web.

FIG. 4 is an exploded view in perspective indicating the assembly of the cup member and attached bore insert to the shaped heat web.

FIG. 5 is a fragmented elevational sectional view showing the arrangement for stacking the series of heat webs, cup members and bore inserts, with spacers between, prior to assembly into a ceramic tube.

FIG. 6 is an enlarged view in sectional elevation, showing several of the heat webs, cup members, bore inserts and spacers stacked on a rod used in this procedure.

FIG. 7 is a fragmentary sectional elevational view showing the assembly after being inserted into the ceramic tube, with an anode sub-assembly in the anode end, an end cap in position at the anode end, and a tube end flange in position at the cathode end, all in preparation for brazing.

FIG. 9 is a sectional view in elevation taken along the line 9—9 in FIG. 8, showing the construction of the gas fill assembly.

FIG. 10 is an exploded view in elevation, illustrating the components and assembly of a valving portion of the fill assembly.

DESCRIPTION OF PREFERRED EMBODIMENTS

Figure 1:
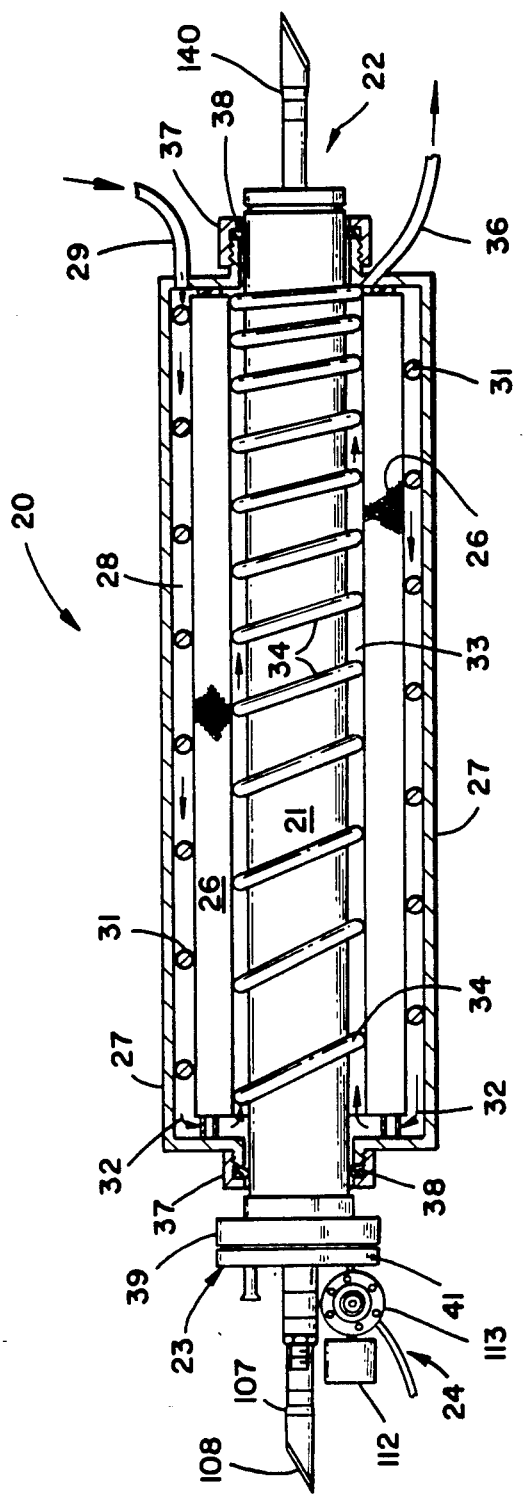
FIG. 1 is a partially schematic sectional elevation view showing an assembled gas laser according to the invention, with the discharge tube, the magnet surrounding the discharge tube and the coolant flow path.

In the drawings, FIG. 1 illustrates, partially in section and partially schematically, a gas laser 20 such as an argon laser, including a plasma tube or discharge tube 21 with an anode end 22 and a cathode end 23, a gas fill system 24, an electromagnet 26 surrounding the discharge tube 21, and an outer casing 27 surrounding the magnet. As illustrated, there are cylindrical spaces defined between the outer casing 27 and the magnet 26, and between the magnet 26 and the exterior of the discharge tube 21. Through these spaces flow a coolant such as water, which enters the outer coolant flow space 28 at one or more entry ports 29, being induced into a helical flow path by a helical flow diverter coil 31. The swirling cooling liquid then flows around the end of the magnet 26 as indicated by arrows 32, and into the interior cooling space 33 where it encounters another flow diverter coil 34 which keeps the coolant swirling in the same direction of rotation as in the outer space 28. The coil 34, however, is different in that it is of a variable pitch, with the coils spaced most widely at the point of entry of the liquid to the cooling space 33 (at the left in FIG. 1) and the coils becoming gradually more closely spaced along the length of the discharge tube 21 until, at the exit end of the cooling space 33, the coils are most closely spaced. The coolant exits the space 33 at an outlet port 36. The purpose of the variable pitch in the flow diverter coil 34 is to prevent cavitation which might be caused by tight coils at a location of too great pressure drop. The variable pitch flow diverter 36 enables maximum cooling with minimum pressure drop. It facilitates a substantially constant surface temperature on the plasma tube for more uniform temperature distribution along the length of the tube to minimize stress and thermal warping in the tube.

As also seen in FIG. 1, the laser assembly includes threaded sleeve members 37 at both ends, for sealing the outer casing 27 to the exterior of the plasma tube 21, using compressible O-rings 38. At the cathode end 23 of the laser, a tube end flange 39 is secured preferably by brazing as described below, to the end of the ceramic tube 21, and a header flange 41 of the cathode assembly is secured to the tube end flange 39, with the cathode components extending into the discharge tube 21 through the tube flange 39, as more fully described and illustrated below.

FIG. 2 shows a heat web 45 for use in the discharge tube 21, in the flat form of the heat web, before it has been crimped into shape for use in the tube. As indicated, the heat web 45 has a series of petals 46 around its perimeter, each being discrete from the neighboring petals. The heat web may include series of holes 47 and 48, for establishing a return gas flow path in the discharge tube for the operating laser. As also shown in FIG. 2, the flat heat web 45 has plated on it a brazing material 49 both at the tip ends 51 of the petals and at an inner annular region as indicated in FIG. 2, for brazing to other surfaces as will be seen below.

FIG. 3 shows in exploded view a cup member 52 and a bore insert 53 of sputter-resistant material, with a central aperture 54. The sputter-resistant insert 53 may be of tungsten, and the cup 52 as well as the heat web 45 may be of copper. The tungsten disk 53 is to be brazed to the protruding end 56 of the cup member, over a central opening 57 of the cup member. For this purpose, a higher-temperature brazing material is used than that used to braze the cup member to the heat web and the heat web onto the metallized bands situated within the ceramic discharge tube 21 in the assembly of a laser according to the invention. This is so that the tungsten disk 53 can first be brazed to the cup member 52, prior to a final, lower-temperature braze. The stepped brazing procedure may employ, for example, a nickel-gold braze and then a copper-silver braze.

In FIG. 4 the heat web 45 is seen in its crimped shaped configuration, with the ends 51 of the petals 46 being formed into flanges which form a generally cylindrical shape as indicated. In FIG. 4 the sputter-resistant disc 53 has been brazed to the cup member 52, and this sub-assembly is ultimately to be brazed to the heat web 45, with a flat back side 58 of the cup member 52 to be engaged against the inner annulus shown in FIG. 2 which has been plated with brazing material. The outer sides of the petal flanges 51 are also coated with brazing material as discussed above.

FIGS. 5 and 6 illustrate the procedure by which heat webs 45 and cup members 52 are assembled into a stack prior to being inserted into the ceramic discharge tube 21, according to the method of the invention. The stacking is performed on a stacking base 60 from which extend upwardly three guide rods 61 (one being shown in FIG. 5) and a graduated stacking gauge 62 at one side, positioned between the rods 61. Appropriate spacers 63 and 64 are positioned successively on the base fixture 60, to set the level of the first, lowermost heat web 45 correctly with respect to the stacking gauge 62, which may have an indicator line or grove 66 for the position of each heat web. The heat webs must be spaced apart accurately according to prescribed tolerances, since the outer surfaces of the petal flanges 51 must mate appropriately with annular metallized areas on the interior surface of the ceramic discharge tube 21 upon brazing as further explained below.

As shown in FIGS. 5 and 6, the cup member 52 with its attached sputter-resistant disk 53, is placed in the stacking assembly, with the heat web 45 positioned over it such that the disk 53 passes through the large central opening in the heat web. An annular insulative spacer 67 is placed on the heat web as shown in the drawings, to support the next heat web 45 at the appropriate spacing. The heat webs and cup members/bore inserts are placed over a stacking rod 68 which rests on the base 60 as shown. As each insulative spacer member 67 is placed on the heat web immediately below, a slideable indicator device 69 on the stacking gauge 62 is positioned on the spacer member and it is determined by reference to the indicia 66 whether the assembly is at the appropriate level, and if not, by what distance the level is divergent from the prescribed level, i.e. above or below.

There will be a tendency to drift away from specified levels, since the spacer members 67 are not precisely the optimum height. Therefore, when the stack becomes undersized, i.e. below the specified level at that point, by a selected distance such as ten thousandths of an inch, a special corrective oversized spacer member is used to bring the stack to the prescribed level. Similarly, when the stack is oversized by ten thousandths of an inch, a special undersized spacer is used to correct the stack. In this way, it is assured that the heat webs will be in proper registry with the metallized areas of the ceramic tube's internal wall in the final assembly.

As shown in FIG. 5, at the bottom of the stack, at the cathode end of the assembly that will be incorporated in the discharge tube, there preferably are a series of bore inserts with larger central apertures, serially decreasing in diameter from a largest diameter bore insert 53a at the bottom position, i.e. the cathode end of the stack, to a bore insert disk 53f which has the smallest oversized aperture. The next higher bore insert 53 is of the normal, smaller aperture size. For centering of these special bore inserts 53a through 53f during stacking, the spacer member 64 has attached to its upper end a fixture 71 of stepped, serially decreasing diameters as shown, and the stacking rod 68 passes through this fixture 71.

In FIG. 5, the stack of components is shown completed, with an anode sub-assembly 72 at the top, at the anode end of the assembly. At the top of the stack is a spacer/gauge device 73 through which is positioned the guide rod 68 and a rod end handle member 74 as indicated. The spacer/gauge 73 helps gauge the location of the end of the ceramic discharge tube with respect to the assembly of heat webs and the anode.

Following the completion of the stacked assembly as shown in FIG. 5, the entire stacked assembly including the guide rod 68 with a lower end retainer 76, and the cathode end spacers 63 and 64, is lifted off the stacking base fixture 60 and inserted into a ceramic tube 21 (as shown, in the assembled configuration, in FIG. 1), such that each of the heat webs is adjacent to a metallized area on the internal surface of the ceramic tube. Once the stack is in place in the ceramic tube, the guide rod 68 used in stacking is removed, and is replaced by a rod 80 of a metal having a low coefficient of thermal expansion, preferably tungsten, the preferred material for the bore insert discs 53, since the rod 80 fits with very close tolerance through the apertures in the bore inserts, and the diametric thermal expansion of the rod 80 should be no greater than that of the bore insert apertures. The stack with the rod 80 is shown in FIG. 7, inserted in the ceramic tube 21 in preparation for brazing. As indicated in FIG. 7, the stack has now been inverted for brazing primarily so that the cup members 52 will bear against the adjacent heat webs 45 for contact during brazing. Otherwise, these cup members 52 would tend to fall and separate somewhat from the adjacent heat web, in the stacking orientation as in FIG. 5.

As also indicated in FIG. 7, an anode end spacer 81 has been added, to space the anode assembly 72 from an anode end cap 82 which is to be brazed against the end of the ceramic tube 21 during heating. A ceramic end sleeve 83 is brazed to the other side of an annular end cap flange 84, and a positioning fixture 86 holds these components in place, all supported by a bearing member 87 secured to the lower end of the rod 80 as indicated. FIG. 7 indicates annular metallized areas 88 on the internal surface of the ceramic tube 21, against which the heat webs 45 will be expanded into contact and brazed during heating.

At the cathode end of the assembly, which is now the upper end, is a spacer 89 of appropriate dimension, on top of which bears a weight 90 for putting the appropriate bearing pressure on the top of the assembly, the weight 90 being freely slideable on the rod 80. At the upper end of the rod is a suspending fixture 92 by which the entire assembly is suspended in an oven for heating.

Also seen at the cathode end (upper end) of the assembly in FIG. 7 is the tube end flange 39 to be connected to the cathode end of the tube 21. The tube flange 39 is connected to an annular connecting component 94, which in turn is to be brazed against the end of the ceramic tube 21 during brazing. Again, a ceramic ring 96 may be brazed against the outside of the connecting component 94, and these components are held appropriately in place for brazing by a fitting 97. An outer weight 91, surrounding the weight 90, may be employed to apply pressure to the fitting 97 to hold the components together for brazing, and in addition a cylindrical weight 98 may be suspended from the tube end flange 93 by bolts 99 to help urge the connecting component 94 against the end of the ceramic tube 21.

Brazing is accomplished in an oven, preferably at about 800° C., depending on the brazing material used. As discussed above, a copper-silver brazing material may be used to braze together the components of the assembly as shown in FIG. 7, and the 800° heating is appropriate for this brazing material. At this point the bore inserts 53 have already been brazed to the cup members, using a higher-temperature brazing material that will not be affected in the brazing of the entire plasma tube assembly.

Figure 8:
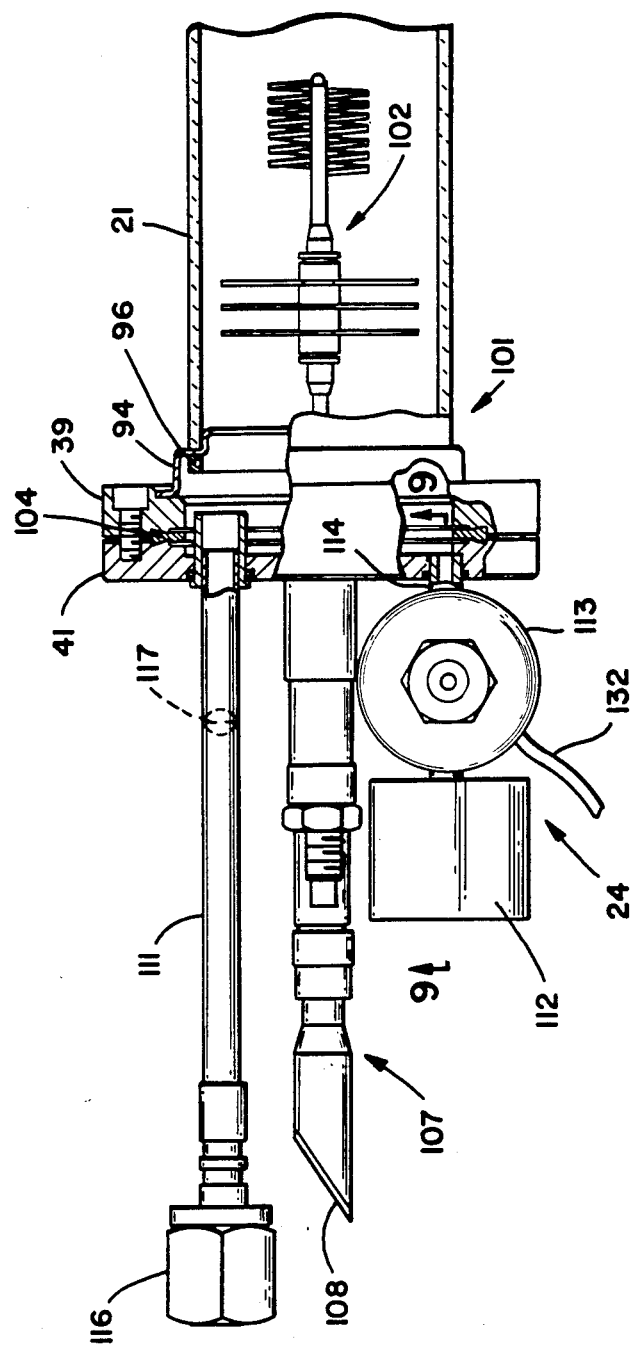
FIG. 8 is an elevation view, partially in section, showing the cathode end of the assembled laser, with a gas fill assembly attached.

FIG. 8 shows the cathode end of the laser discharge tube assembly. The tube end flange 39, via the connector piece 94, has been brazed to the end of the tube 21, and a cathode assembly 101 has been connected onto the tube end flange 39 with the cathode 102 inserted through the tube end flange and into the tube 21 as shown. The header flange 41 of the cathode assembly is bolted or otherwise connected to the tube end flange 39 to retain the cathode assembly in place. The two flanges may be sealed together with a deformable metal (e.g. copper) gasket 104 compressed between them.

From the center of the header flange 41 extends a tube 106, to the end of which is connected a cathode end window assembly 107, with a window 108 at its end. The window assembly is connected to the tube 106 at a low-temperature braze 109 between adjacent fittings. This enables easy replacement of the window 108 when required after a period of use.

Connected into the header flange 41, for fluid communication with the interior of the plasma tube 21, are an evacuation tube 111 and the gas fill system 24 with a gas reservoir 112, a valve assembly 113 (shown without solenoids) and a conduit 114 leading to the plasma tube 21 through the header flange 41. The evacuation tube 111 has a coupling 116 for connection to a source of vacuum, for evacuation of the plasma tube 21 during heating steps, as further explained below. It is also used to fill the tube 21 with gas to a positive pressure, according to one step of the preferred method. As indicated at 117 in dashed lines, the tube 111 may be closed off after final assembly of the laser by pinching the tube and permanently sealing it off.

The gas fill assembly 24 has important features that enable the plasma tube to be efficiently brazed, heat-cleaned, assembled and charged with gas. The solenoid-operated valve assembly 113 is structured in such a way that its major gas-handling components can be subjected to high temperature heating without damage. FIGS. 9 and 10 show the gas fill assembly 24 and specifically the valve assembly 113 in detail.

As FIGS. 9 and 10 illustrate, a valve body 120 has secured to it upper and lower flanges 121 and 122, each of which has a valve housing 123 extending from it. The flanges 121 and 122 are connected to the valve body by bolts 124 at staggered locations around the valve body. The bolts draw the components together to compress deformable metal gaskets 126 (e.g. copper) between them to seal them against gas leakage. Upper and lower valve plungers 127 are slideable in the valve housings 123, operable by solenoids 128, to open and close valves by engagement or disengagement of elastomeric sealing discs or pucks 129 in the ends of the plungers against the ends of a small cylindrical gas metering cavity 131 at the center of the valve body 120. Electrical leads 132 are shown extending from the solenoids 128, for operation of these two valves. The valve plungers 127 are urged toward the closed position, preferably by compression springs 133 as shown.

As shown in FIGS. 9 and 10, an inlet channel or bore 134 leads from the gas reservoir tank 112 to an inlet chamber 136 adjacent to the gas metering chamber 131, on the other side of which is an outlet chamber 137 leading to an outlet conduit 138 connected to the header flange 41 of the cathode assembly and in communication with the interior of the plasma tube.

When the laser is fully assembled and operational, gas is stored under pressure in the reservoir tank 112. When gas pressure in the plasma tube is below a predetermined level and more gas is needed, the upper valve plunger 127 is first opened, allowing gas from the reservoir tank and the inlet chamber 136 to fill the metering chamber 131. The valve is then closed, and the lower valve plunger is opened to admit the metered volume of gas through the outlet chamber 137 and into the plasma tube. This is repeated until sufficient gas has been admitted to the plasma tube.

FIG. 10 illustrates the assembly of the valve body 120, plungers 127, flanges 121 and 122, and solenoids 128. The elastomeric seals 129, which may be of a material marketed as Viton, cannot be subjected to high temperatures such as used in brazing. The assembly according to the invention permits quick and efficient removal of the plungers 127, as well as the solenoids 128, and easy re-assembly of the remaining parts without the plungers, in gas-sealed relationship, when the plasma tube assembly with the fill assembly is to be put in a high-temperature oven, for heat-cleaning. With the solenoids 128 removed via nuts 139, the bolts 124 are removed to separate the flanges 121 and 122 from the valve body 120, after which the valve plungers 127 may be extracted from the valve housings 123. The seals 126 are discarded, and new seals are used, as the flanges 121 and 122 are reassembled to the valve body 120. The entire assembly may then be heated to a relatively high temperature, effecting heat-cleaning of the gas flow path as well as the plasma tube, from the gas reservoir tank 112 through the valve assembly and to the plasma tube.

At a stage wherein the plasma tube assembly is to be heat-cleaned a final time with the valve plungers included, at a lower temperature safe for the Viton seals 129 on the valve plungers, permanent magnets may be put in place at the solenoids 128 to hold the plungers 127 in the retracted, valve-open position. The valves are thus held open temporarily to establish fluid communication from the gas tank 112 to the plasma tube, and the entire plasma tube assembly, including the gas fill assembly, can be charged with gas through the evacuation tube 111.

The procedure for assembling the laser 20 according to a preferred embodiment of the invention will now be described.

First, the stack of heat webs 45, cup members/bore inserts, and insulative spacers 67 is assembled on the stacking rod 68 with the stacking gauge 62 as described with reference to FIGS. 4, 5 and 6, forming a plasma tube core. The bore inserts 53 have already been brazed in a high-temperature braze to the cup members 52, as illustrated in FIG. 3. The heat webs have been crimped into the shape shown in FIG. 4. The anode assembly 72 is added to the stack, and the assembly is inserted into a precision ceramic discharge tube 21. The stacking rod 68 is replaced with the straight rod 80, end members are added to the tube and fixtures are added to retain the assembly together and at an appropriate position in the ceramic tube 21. The assembly is inverted as shown in FIG. 7 and suspended in an oven for brazing, which may be at about 800° C. In this heating and brazing operation, the heat webs 45 are expanded diametrically outwardly into contact with the metallized areas on the tube wall and brazed to the metallized areas. At the same time, the cup members 52 are braced to the heat webs, fixing the aligned positions of the bore insert apertures 54 on the rod 80. Also, the end connections preferably are brazed to the ceramic tube at this time, as explained above with reference to FIG. 7.

The fixtures are removed from the brazed assembly and the cathode assembly is assembled to the tube end flange at the cathode end of the plasma tube, as described with reference to FIG. 8. The window assembly 107 is brazed at the end of the tube 106 (FIG. 8) by a lower-temperature braze as described above. At the anode end, a window assembly 140 is also secured (FIG. 1), so that the plasma tube is now closed, the valve plungers 127 having been removed from the gas fill valve assembly 113 and the assembly 113 bolted and sealed together (FIGS. 9-10). The evacuation tube 111 now provides the only access to outside.

A vacuum source is attached to the evacuation tube 111, and vacuum is applied to substantially evacuate (down to about $10^{-7}$ torr) the interior of the plasma tube, window assemblies, and gas fill assembly including the reservoir tank 112 and valve assembly 113.

With vacuum maintained, the assembly is subjected to heat-cleaning, preferably at about 400° C., which is high enough to effect heat-cleaning but low enough not to affect any brazed connections.

Next the assembly is filled with gas, i.e. the operating gas for the laser, such as argon gas, to a positive pressure by connecting a pressurized gas source to the evacuation tube 111. With positive pressure in the system, the valve assembly flanges 121 and 122 (FIGS. 9-10) are removed, the valve plungers 127 are inserted, and the flanges are replaced and resealed with new seals 126. In this way, contamination at this point is substantially eliminated because gas flows out of the valve assembly when it is dismantled, keeping contaminants from flowing in.

The valve plungers are held in the open positions against the springs 133 for the next step, which may be by temporarily putting permanent magnets where the solenoids 128 will be in the final assembly. With the valves open, the plasma tube assembly is again evacuated and heated, to heat-clean a final time at a lower temperature safe for the elastomeric valve seals or pucks 129. This heating may be at about 200° C.

Next the plasma tube assembly is again filled to a positive pressure with the operating gas for the laser, this time to the initial pressure desired for the gas reservoir tank 112. The valve plungers are released (e.g. by removal of permanent magnets) and allowed to close, isolating the gas reservoir from the interior of the plasma tube. The solenoids 128 may now be installed.

Again the plasma tube is evacuated via the evacuation tube 111, to about $10^{-7}$ torr and the tube 111 is then sealed off, as by pinching and sealing at 117 as shown in FIG. 8. Gas is added to the appropriate pressure in the plasma tube by use of the solenoid-operated gas fill assembly 24, metering gas out from the reservoir tank 112. The magnet 26 and outer shell 27 are assembled onto the plasma tube, as in FIG. 1.

The ability to perform a 400° C. heat-clean as described above is enabled by the structure of the gas fill assembly and is an important feature of the invention. All components touching the gas flow path, except for the plunger ends with their elastomeric pucks, are subjected to the 400° C. heat-clean. The plunger ends themselves are subjected to the subsequent 200° C. cleaning.

The preferred embodiment described herein is intended to be purely illustrative and not limiting of the scope of the invention. Other embodiments and variations will be apparent to those skilled in the art and may be made without departing from the essence and scope of the invention as defined in the following claims.

What is claimed is:

1. A method for assembling a plasma tube of a gas laser, comprising:
   providing a ceramic tube with an internal wall having a precise diameter with alternately metallized and non-metallized areas at regular intervals along a longitudinal axis of the tube;
   stacking with a stacking gauge, outside the ceramic tube, a series of heat webs and insulative spacers, in alternating relationship, the heat webs being thereby spaced apart substantially the same distance as the metallized areas in the ceramic tube, and the heat webs being of less diameter than the internal wall of the ceramic tube and having brazing material coated on their outer surfaces;
   inserting the stack of heat webs and spacers together into the ceramic tube so that each heat web is adjacent to and in registry with a metallized area on the internal wall of the ceramic tube; and
   heating the resulting assembly in vertical orientation generally uniformly to a sufficient temperature to expand the heat webs diametrically so that each engages outwardly against the adjacent metallized area of the ceramic tube, with the brazing material melting and causing the heat webs to be brazed to the metallized areas of the ceramic tube.

2. The method of claim 1, further including the step of compensating for built-up error in the stack of heat webs and spacers, to assure proper registry of the heat webs with the metallized areas of the ceramic tube, by using an undersized spacer when the progressing stack becomes oversized by a predetermined distance, and by using an oversized spacer when the progressing stack becomes undersized by a predetermined distance, and by determining such oversized and undersized conditions by reference to the stacking gauge as the stack progresses.

3. The method of claim 1, wherein each heat web includes a disc-like central area and an annular series of petals extending outwardly therefrom, integral with the central area but discrete from one another, each petal terminating in a flange generally perpendicular to the central area, with the brazing material coated thereon, for contacting and being brazed to a metallized area of the ceramic tube, the petal flanges together forming a generally cylindrical annular rim for engagement with the metallized area, whereby hoop stress on the ceramic tube during temperature changes is substantially eliminated by flexibility in the petals.

4. The method of claim 3, wherein each petal is of generally U-shaped configuration in cross section, with an inner leg extending generally axially from the central area, then curving back into the flange.

5. The method of claim 1, wherein each heat web has placed against it centrally a cup to which is secured a bore insert with a central aperture, the bore insert being brazed to the cup by a higher-temperature brazing material than that subsequently used to braze the heat webs to the ceramic tube, and wherein the cups are brazed to the heat webs during the heating step.

6. The method of claim 5, wherein the heat webs and cups are copper, with copper-silver brazing material used to braze them together and to the ceramic tube, and wherein the bore insert is brazed to the cup by a nickel-gold brazing material.

7. The method of claim 1, wherein the assembly is heated and the brazing is accomplished at about 800° C.

8. The method of claim 1, wherein the stack of heat webs and spacers is retained on a straight rod when inserted into the ceramic tube and during heating.

9. A method for producing a gas laser, comprising:
assembling a core including a series of heat webs and discs with sputter-resistant bores into a ceramic tube, and including an anode assembly and an end cap at the anode end of the tube and a tube end flange for receiving a cathode assembly at the cathode end of the tube, the heat webs having brazing material on their periphery for brazing to the internal wall of the ceramic tube;
heating the assembly to a first higher temperature to braze the heat webs to the tube while also brazing the end cap and the tube end flange to the ends of the tube;
connecting the cathode assembly to the tube end flange and into the tube, with a gas fill assembly connected to the cathode assembly exterior of the tube, including removable valve plungers with elastomeric valve closure members in the gas fill assembly, the plungers being removed, and attaching cathode end and anode end window assemblies, to close the plasma tube;
attaching a vacuum source to the assembly and applying vacuum and maintaining vacuum in the assembly including the tube assembly and the connected fill assembly while heating the assembly to a second, lower temperature high enough to heat-clean the assembly but not to affect the brazed connections;
filling the assembly, including the gas fill assembly, with gas to a positive pressure;
replacing the removable valve plungers, then holding them open against normally closing spring pressure;
again filling the assembly, including the gas fill assembly, with gas to a positive pressure desired in operation for a gas reservoir of the gas fill assembly;
releasing the valve plungers and allowing them to close, to isolate the gas reservoir from the ceramic tube; and
evacuating the ceramic tube and then filling it to the appropriate gas pressure using the gas fill assembly.

10. The method of claim 9, wherein, following replacement of the valve plungers and with them held open, the assembly is again evacuated and heated, to a third temperature for heat-cleaning but low enough to avoid damage to the elastomeric valve closure members.

11. The method of claim 10, wherein the third heating is at about 200° C.

12. The method of claim 9, wherein the valve plungers are part of solenoid-operated valves, and wherein the plungers are held open by temporarily placing permanent magnets in the place of solenoids.

13. The method of claim 9, wherein the first heating, for brazing, is at about 800° C. and the second heating is at about 400° C.

14. The method of claim 9, wherein the second heating is at about 400° C.

15. The method of claim 9, wherein the gas fill assembly has a gas reservoir connected to one side of a valve body, the other side of the valve body being connected into the ceramic tube, and a pair of oppositely positioned removable flanges connected to the valve body, each retaining one of the valve plungers, so that the flanges can be removed from the valve body to remove the valve plungers, then the flanges can be re-assembled with seals for sealing the assembly with a closed gas path from the reservoir through the valve body to the ceramic tube.

16. A method for producing a gas laser, comprising:
assembling a core including a series of heat webs and discs with sputter-resistant bores into a ceramic tube, the heat webs having brazing material on their periphery for brazing to the internal wall of the ceramic tube;
heating the assembly to a first higher temperature to braze the heat webs to the tube;
connecting additional components at the ends of the tube, including a cathode assembly and cathode end and anode end window assemblies, to close the plasma tube, with a gas fill assembly connected to the cathode assembly exterior of the tube, including removable valve plungers with elastomeric valve closure members in the gas fill assembly, the plungers being removed;
heating the assembly to a second, lower temperature high enough to heat-clean the assembly but not to affect the brazed connections;
filling the assembly, including the gas fill assembly, with gas to a positive pressure;

replacing the removable valve plungers, then holding them open against normally closing spring pressure;

again filling the assembly, including the gas fill assembly, with gas to a positive pressure desired in operation for a gas reservoir of the gas fill assembly;

releasing the valve plungers and allowing them to close, to isolate the gas reservoir from the ceramic tube; and evacuating the ceramic tube and then filling it to the appropriate gas pressure using the gas fill assembly.

17. The method of claim 16, wherein, following replacement of the valve plungers and with them held open, the assembly is evacuated and again heated, to a third temperature for heat-cleaning but low enough to avoid damage to the elastomeric valve closure members.

18. The method of claim 16, wherein the first heating, for brazing, is at about 800° C. and the second heating is at about 400° C.

19. The method of claim 16, wherein the gas fill assembly has a gas reservoir connected to one side of a valve body, the other side of the valve body being connected into the ceramic tube, and a pair of oppositely positioned removable flanges connected to the valve body, each retaining one of the valve plungers, so that the flanges can be removed from the valve body to remove the valve plungers, then the flanges can be re-assembled with seals for sealing the assembly with a closed gas path from the reservoir through the valve body to the ceramic tube.

20. The method of claim 16, wherein the heating of the assembly to the second, lower temperature is accomplished with the tube assembly and the connected fill assembly under vacuum.

21. A method for assembling a plasma tube of a gas laser, comprising:

providing a ceramic tube with an internal wall with alternately metallized and non-metallized areas at regular intervals along a longitudinal axis of the tube;

stacking outside the ceramic tube, a series of heat webs and insulative spacers, in alternating relationship, the heat webs being thereby spaced apart substantially the same distance as the metallized areas in the ceramic tube, and the heat webs being of less diameter than the internal wall of the ceramic tube and having brazing material coated on their outer surfaces;

inserting the stack of heat webs and spacers together into the ceramic tube so that each heat web is adjacent to and in registry with a metallized area on the internal wall of the ceramic tube; and heating the resulting assembly in vertical orientation generally uniformly to a sufficient temperature to expand the heat webs diametrically so that each engages outwardly against the adjacent metallized area of the ceramic tube, with the brazing material melting and causing the heat webs to be brazed to the metallized areas of the ceramic tube.

22. The method of claim 21, wherein each heat web includes a disc-like central area and an annular series of petals extending outwardly therefrom, integral with the central area but discrete from one another, each petal terminating in a flange generally perpendicular to the central area, with the brazing material coated thereon, for contacting and being brazed to a metallized area of the ceramic tube, the petal flanges together forming a generally cylindrical annular rim for engagement with the metallized area, whereby hoop stress on the ceramic tube during temperature changes is substantially eliminated by flexibility in the petals.

23. The method of claim 21 wherein each heat web has placed against it centrally a cup to which is secured a bore insert with a central aperture, the bore insert being brazed to the cup by a higher-temperature brazing material than that subsequently used to braze the heat webs to the ceramic tube, and wherein the cups are brazed to the heat webs during the heating step.

24. The method of claim 21, wherein the stack of heat webs and spacers is retained on a straight rod when inserted into the ceramic tube and during heating.

* * * * *